United States Patent Office 3,363,030
Patented Jan. 9, 1968

3,363,030
DYEABLE POLYOLEFIN TEXTILE FIBERS CONTAINING AMINE CONDENSATES OF IMPROVED THERMAL STABILITY
Giuseppe Cantatore, Terni, Italy, assignor to Montecatini Edison S.p.A., Milan, Italy
No Drawing. Filed Oct. 18, 1966, Ser. No. 587,412
Claims priority, application Italy, May 24, 1962, 10,338/62
9 Claims. (Cl. 260—897)

ABSTRACT OF THE DISCLOSURE

Dyeable polymeric compositions, preferably in the form of textile fibers, consisting essentially of (1) a polyolefin selected from the group consisting of polyethylene and polymers of higher alpha-olefins consisting prevailingly of isotactic macromolecules and (2) about 1–25% by weight of at least one basic nitrogen polycondensation product obtained by reacting a dihalo alkane or a dihalo alkanol with a bis-secondary diamine.

This application is a continuation-in-part of application Ser. No. 282,167, filed on May 21, 1963, now abandoned.

This invention is directed to the preparation of textile fibers, films, tapes, and other shaped articles from polyolefins consisting essentially of isotactic macromolecules. More specifically, this invention is directed to the preparation of these articles from polyethylene and polymers of higher alpha-olefins containing isotactic macromolecules prepared by low pressure polymerization with stereospecific catalysts. Products of this invention have been found to be particularly receptive to dyes. These dyeable articles, and particularly the textile fibers, are prepared by extruding a mixture of an isotactic polyolefin and a basic-nitrogen polycondensation product. The polymerization product is prepared by condensing a dihalogen-derivative with a bis-secondary diamine.

The polyolefins used in preparing the dyeable articles are characterized by the general formula:

$$(R—CH=CH_2)_n$$

wherein R is an alkyl radical, aryl radical, or a hydrogen atom. Representative polyolefins, for purposes of this invention, include polyethylene, polybutene-1, polypentene-1, poly-4-methylpentene-1, polystyrene, etc. Of the polyolefins, however, the preferred is polypropylene which prevailingly consists of isotactic macromolecules and is obtained by the stereospecific polymerization of propylene, for example with catalysts prepared from solid, low valency, crystalline transition metal compounds, such as $TiCl_3$ and an alkyl-aluminum compound such as diethyl Al monochloride.

While various processes of preparing fibers from polyolefins have been proposed heretofore, most of these fibers have a very poor affinity for dyes even though they are strong and are substantially resistant to chemical agents.

Accordingly, it is an object of this invention to provide a process for preparing shaped articles and, more specifically, fibers of polyolefins having a remarkable affinity for dyes. Moreover, it is an object of this invention to provide a process for preparing polyolefin fibers exhibiting fast colors in addition to exceptionally good mechanical and chemical properties.

It is still another object of this invention to provide a method of preparing textile fibers, films, tapes, etc., by extruding a mixture of an isotactic polyolefin and a basic-nitrogen polycondensation product.

It is still another object of this invention to provide a composition which has an exceptionally good affinity for dyes and which can be extruded to various shapes and forms by conventional methods.

It is still a further object of this invention to provide a new composition which has outstanding dyeing characteristics and can be extruded to various shapes by conventional methods.

These and other objects of the invention will become obvious from the more complete and detailed description which follows.

It has been discovered quite unexpectedly that it is possible to prepare shaped articles, particularly textile fibers, which have outstanding affinity for dyes. These articles are obtained by extruding a mixture of an isotactic polyolefin with approximately 1 to 25% by weight of a basic-nitrogen polycondensation product. This polycondensation product is obtained by reacting a dihalo-derivative with a bis-secondary diamine. The diamine may be either an aliphatic, aromatic or heterocyclic diamine.

More specifically, it has been found that dyeable polymeric compositions can be obtained from a mixture consisting essentially of:

(a) an isotactic polyolefin, such as polypropylene; and
(b) approximately 1 to 25% by weight of the total composition of at least one basic-nitrogen polycondensation product. The polycondensation product is obtained by the reaction of a dihaloderivative and a bis-secondary diamine. The bis-secondary diamine may be either an aliphatic, aromatic or heterocyclic diamine or it may be alkylated with an alkylhalide such as dodecyl, hexadecyl, or octadecyl halides.

Typical examples of the polycondensation products to be used in combination with the polyolefins in accordance with this invention include the following:

piperazine/dichloroethane,
piperazine/1,3-dibromopropane,
piperazine/1,6-dichlorohexane,
piperazine/1,3-dichloro-2-propanol,
piperazine/1,10-dichlorodecane,
piperazine/dichloroethane/octadecyl chloride,
2,5-dimethylpiperazine/dibromoethane,
symmetric dimethylethylenediamine/dichloroethane,
symmetric dimethylethylenediamine/dibromoethane,
symmetric diethylhexamethylenediamine/dichloroethane,
symmetric dibutyl-n-hexamethylenediamine/
 dichloroethane,
dimethyl-p-phenylenediamine/dichloroethane.

Normally, a mixture of the two components can be prepared by merely adding the powdered polycondensation product to the polyolefin with agitation.

As an alternative, the polyolefin can be added to a solution of the nitrogen-polycondensation product and the solvent subsequently removed. The fact that the polycondensates are highly compatible with melts of the polyolefins suggests that the mixture may be prepared by various other means.

After the mixture of the two components is obtained, it is granulated, preferably in the absence of oxygen, and then extruded in a melt spinning device. These spinning devices are preferably spinnerets having a length to diameter ratio higher than 1. Likewise, the spinning should be carried out in the absence of oxygen or in an inert atmosphere such as nitrogen.

To facilitate the spinning of the mixture, it is advisable to use a small amount of a solid dispersing agent. This dispersing agent acts to disperse the basic nitrogen polycondensation product in the molten mass of polymer so as to obtain a homogeneous mixture. The solid dispersing agent includes such compounds as cetyl and stearyl alcohol, stearic acid, benzoin, furoin, vinyl stearate, mono-, di- and tri-stearic esters of glycerol, mono-ethanolamine stearate, stearamide, N-diethanol-lauramide, $C_6$–$C_{30}$ aliphatic amines or phenols, polystearamide, polyacrylic acid, polystyrene and styrene copolymers, terpene polymers, and the like.

In addition to the dispersing agents, other ingredients such as opacifiers and organic or inorganic pigments may be added to the polyolefin during mixing. In addition, other ingredients such as UV absorbers, dyes, fillers and anti-acid agents may be used in the dyeable mixture. The anti-acid agents include such compounds as the alkali or alkaline earth metal salts of fatty acids, such as stearic acid.

The fibers obtained by spinning the mixture of the polycondensation product and the polyolefin are subjected to a stretching operation whereby they are stretched anywhere from 2 to 10 times their original length at temperatures of about 80° to 160° C. More specifically, the fibers are stretched in devices heated with hot air or steam or a similar fluid to ratios ranging from about 1:2 to 1:10. The stretched fibers are then subjected to a dimensional stabilization treatment under conditions of free or hindered shrinking at temperatures of about 80° to 160° C.

The fibers thus obtained are mono or plurifilaments and can be used in preparing continuous fibers or staple fibers or for the preparation of bulk yarns. If required, the nitrogen-polycondensation component of the mono or plurifilaments may be water-insolubilized by treating the fibers with a water insolubilizing agent. The compounds particularly suitable for this purpose include the mono- or diepoxy compounds, mono- and diisocyanates, mono- or dialdehydes, halogens, divinylbenzene, phosphoxides, polyvinylalcohol, etc.

It has been found that the fibers of this invention have a particularly high stability toward light and a remarkable affinity to various dyes such as the acid, metallized and disperse dyes. However, in some instances, the articles of manufacture may be treated with sulfuric acid or other acids so as to improve the dyeability and the color fastness of the product.

To illustrate the remarkable affinity of these products toward various dyes, a control dyeing test was carried out for 1½ hours at the boiling point of the dye bath. The dye bath contained approximately 2.5% by weight of dye based on the weight of the fibers, with a fiber to bath ratio of about 1:40. Dyeing with both the acid and the metallized dyes was completed in the presence of about 3% by weight of the fiber of ammonium acetate and 1% by weight of a surface active agent.

The surface active agent in this particular instance was the condensation product of 6–20 mols of ethylene oxide and 1 mol of an alkylphenol such as p-tert.octylphenol, nonylphenol and the like. After the dye bath had been boiling for approximately 30 minutes, about 2% based on the weight of the fiber of a 20% acetic acid solution was added to exhaust the bath.

In those instances where a dispersed dye was used in place of the acid or metallized dyes, the dyeing was carried out in the presence of about 2% by weight of the fibers of a surface agent. Following the dyeing, the fibers were washed with running water. The finished product had an intense color, was fast to light, and resisted fading during washing.

Typical examples which illustrate the product and process of this invention are given below:

*Example 1*

Approximately 344 grams (4 mols) of anhydrous piperazine, 198 grams (2 mols) of dichloroethane and 1200 cc. of ethanol were introduced into a 5-liter three-necked flask provided with an agitator, a thermometer and a reflux condenser. The mixture was refluxed for about 12 hours and during the last 8 hours, 160 grams (4 mols) of NaOH chips were added. The mixture was cooled down to about 20–25° C., and 198 grams (2 mols) of dichloroethane and 1,200 cc. of ethanol were introduced into the flask.

The mixture was then refluxed further for 12 hours, during the last 8 hours of which approximately 160 grams (5 mols) of NaOH chips were added. At the end of the NaOH addition, the reaction mass was held at the boiling temperature for about 2 hours and then diluted with 1500 cc. of benzene. The mixture was then filtered warm to remove the sodium chloride. The solvent was removed from the filtrate by distilling under reduced pressure and the residue was completely dried by heating to a temperature of about 140°–160° C. for 2 hours. The product obtained was a solid resinous light yellow material having a melting point of about 144°–152° C.

*Example 2*

Approximately 172 grams (2 mols) of anhydrous piperazine, 202 grams (1 mol) of 1,3-dibromopropane and 600 cc. of isopropanol were introduced into a 2 liter three-necked flask provided with an agitator, thermometer and reflux condenser. The mixture was refluxed for about 8 hours, during which time about 80 grams (2 mols) of NaOH were added.

Approximately 202 grams (1 mol) of 1,3-dibromopropane and 600 cc. of isopropanol were added to the mixture which was then refluxed for about 8 hours during which time an additional 80 grams (2 mols) of sodium hydroxide was added in small portions. After separating the sodium bromide by filtration, the solution was dried by heating under a vacuum. A light-yellow solid product was obtained which had a melting point of about 120° C.

*Example 3*

Approximately 172 grams (2 mols) of anhydrous piperazine, 155 grams (1 mol) of 1,6-dichlorohexane and 400 cc. of ethanol were refluxed for about 16 hours. During the last 8 hours of the refluxing, about 80 grams (2 mols) of NaOH were added in small portions. After cooling the mixture to about 20–25° C., 150 grams (1 mol) of 1,6-dichlorohexane and 400 cc. of ethanol were added and the entire mixture was refluxed for 16 hours. During the last 8 hours of refluxing, 80 grams (2 mols) of NaOH were added in small portions. At the end of the addition of the sodium hydroxide, the reaction mass was diluted with 500 cc. of benzene and filtered to remove the sodium chloride. The filtered solution was dried by heating at a temperature of 50–150° C. under vacuum.

A light-yellow resinous product was obtained which had a melting point of about 138–145° C.

*Example 4*

Approximately 172 grams (2 mols) of anhydrous piperazine, 129 grams (1 mol) of 1,3-dichloro-2-propanol and 400 cc. of ethanol were refluxed for 10 hours. During the last 5 hours of refluxing, about 80 grams of NaOH were added in small portions. Approximately 129 grams of 1,3-dichloro-2-propanol and 400 cc. of ethanol were then added to the mixture which was then refluxed for an additional 10 hours. During the last 5 hours of refluxing, 80 grams of NaOH were added to the mixture in small portions.

The mixture was filtered to remove the sodium chloride. The filtrate was poured with agitation into 1,200 cc. of cold acetone. A powdery white precipitate was obtained and separated by filtration. This precipitate was washed with acetone and dried in an oven at 110° C. for 2 hours. The product had a melting point of about 200–212° C.

*Example 5*

Approximately 172 grams (2 mols) of anhydrous piperazine, 211 grams (1 mol) of 1,10-dichlorodecane and 400 cc. of ethanol were refluxed for 20 hours. During the last 5 hours of the refluxing, about 80 grams of NaOH were added to the mixture in small portions. About 211 grams of 1,10-dichlorodecane and 400 cc. of ethanol were further added and the mixture was refluxed for an additional 20 hours. During the last 5 hours of refluxing, an additional 80 grams of NaOH were added to the mixture in small portions. The sodium chloride was removed by filtration and the filtrate was dried by heating under a vacuum. A yellow, resinous product was obtained which had a melting point of about 112–123° C.

*Example 6*

Approximately 189.2 grams (2.2 mols) of anhydrous piperazine, 115.4 grams (0.4 mol) of octadecyl chloride and 700 cc. of isopropanol were refluxed for 36 hours. About 16 grams (0.4 mol) of sodium hydroxide were added after 1 hour. The entire mixture was cooled to 25° C., and 99 grams (1 mol) of dichloroethane was introduced into the mixture. This mixture was refluxed for about 15 hours during which, in the last 5 hours, approximately 80 grams (2 mols) of NaOH were added in small portions. About 99 grams (1 mol) of dichloroethane and 500 cc. of isopropanol were then added to the mixture which was refluxed for an additional 15 hours. During about the last 5 hours of refluxing, about 80 grams (2 mols) of sodium hydroxide were added. The sodium chloride was removed by filtration and the solution obtained was dried by heating to a temperature of about 150° C. under a vacuum. A yellow, waxy product was obtained.

*Example 7*

Approximately 228 grams (2 mols) of trans-2,5-dimethyl-piperazine, 188 grams (1 mol) of dibromoethane and 400 cc. of ethanol were refluxed for about 14 hours and during the last 10 hours of heating a solution of 80 grams (2 mols) of NaOH and 800 cc. of ethanol was added. At the end of the addition of the sodium hydroxide solution, the mixture was cooled at 25° C. and an additional 188 grams (1 mol) of dibromoethane were added and the entire mixture was refluxed for an additional 14 hours. During the last 10 hours of refluxing, a solution of about 80 grams (2 mols) of NaOH and 800 cc. of ethanol was added to the mixture. After the addition of the sodium hydroxide, the mixture was heated to boiling in 4 hours. The ethanol was distilled off from the mixture, and 1000 cc. of benzene were added to the residue. The entire mixture was heated to boiling and the sodium bromide was separated by filtration. The filtered solution was dried by heating to 50–150° C. under a vacuum. The product obtained was a brittle, resinous material having a light-brown color and a melting point of about 169°–175° C.

Analogous results may be obtained by using, instead of trans-2,5-dimethyl-piperazine, 2-methyl-piperazine, 2,5-diethyl-piperazine or 2,3,5,6-tetramethyl-piperazine.

*Example 8*

Approximately 405 grams (1.5 mols) of octadecylamine, 430 grams (5 mols) of piperazine, 247.5 grams (2.5 mols) of dichloroethane and 1000 cc. of methanol were refluxed for 34 hours.

During about the last 10 hours of heating, 200 grams (5 mols) of solid sodium hydroxide were added in small portions. After cooling to a temperature of about 25° C., 247.5 grams (2.5 mols) of dichloroethane and 500 cc. of methanol were introduced and the entire mixture was refluxed for an additional 34 hours. During the last 10 hours of heating, 200 grams (5 mols) of solid sodium hydroxide were added in small portions. After cooling to 25° C., about 149 grams (1.5 mols) of dichloroethane and 500 cc. of methanol were added and the entire mixture was refluxed again for 34 hours. During about the last 10 hours of the heating, 120 grams (3 mols) of solid NaOH were added in small portions. At the end of the addition of the NaOH, the reaction mixture was heated to boiling in 2 more hours and then diluted with 2 liters of benzene. The product was filtered and the solvent was removed, leaving a product which was dried by heating to 150–160° C. under a vacuum for 2 hours. A light-yellow, resinous product was obtained which had a melting point of about 156–162° C.

The following tables describe the operating conditions and the results obtained using the polycondensates prepared in the above Examples 1 to 8 to prepare dyeable polymeric compositions in accordance with the present invention.

TABLE I

| | | |
|---|---|---|
| Example 9 | 4% polycondensate of Ex. 1. | 96% polypropylene. |
| Example 10 | 4% polycondensate of Ex. 2. | 96% polypropylene. |
| Example 11 | 5% polycondensate of Ex. 3. | 95% polypropylene. |
| Example 12 | 4% polycondensate of Ex. 4. | 96% polypropylene. |
| Example 13 | 5% polycondensate of Ex. 5. | 95% polypropylene. |
| Example 14 | 5% polycondensate of Ex. 6. | 95% polypropylene. |
| Example 15 | 6% polycondensate of Ex. 7. | 94% polypropylene. |
| Example 16 | 5% polycondensate of Ex. 8. | 95% polypropylene. |

In all mixes the polypropylene used has the following characteristics:

Intrinsic viscosity _____ 1.5
Ash content _____percent__ 0.01
Residue after heptane extraction _____do____ 97.2

TABLE II

| | Example | | | | | | | |
|---|---|---|---|---|---|---|---|---|
| | 9 | 10 | 11 | 12 | 13 | 14 | 15 | 16 |
| (1) Spinning conditions: | | | | | | | | |
| Screw temperature, °C | 240 | 240 | 240 | 240 | 240 | 240 | 250 | 240 |
| Head temperature, °C | 240 | 240 | 250 | 240 | 240 | 240 | 250 | 250 |
| Spinneret temperature, °C | 240 | 240 | 240 | 250 | 240 | 240 | 250 | 250 |
| Spinneret type, mm | 40/0.8 x 16 | 40/0.8 x 16 | 40/0.8 x 16 | 40/0.8 x 16 | 40/0.8 x 16 | 40/0.8 x 16 | 40/0.8 x 16 | 40/0.8 x 16 |
| Max pressure (kg./cm.²) | 52 | 55 | 61 | 57 | 50 | 52 | 55 | 58 |
| Winding speed (m./minute) | 390 | 390 | 390 | 390 | 390 | 390 | 390 | 390 |
| Stretching conditions: | | | | | | | | |
| Temperature, °C | 120 | 120 | 120 | 120 | 120 | 120 | 120 | 120 |
| Medium | Steam | Steam | Steam | Steam | Steam | Steam | Steam | Steam |
| Stretching ratio | 1:5 | 1:5 | 1:5.2 | 1:5 | 1:5.3 | 1:5.5 | 1:5.5 | 1:5.5 |
| Finishing: Treatment with a 5% aqueous solution of ethylene glycol diglycidyl ether at temp. of (°C.) | 95 | 95 | 95 | 95 | 95 | 95 | 95 | 95 |
| Characteristics of the stretched fibre: | | | | | | | | |
| Tenacity (g./den.) | 5.5 | 5.1 | 5.7 | 5.2 | 5.4 | 6.1 | 5.7 | 6.2 |
| Elongation, percent | 22 | 19 | 25 | 24 | 22 | 23 | 25 | 21 |
| (2) Dyeing with acid dyes: | | | | | | | | |
| Alizarine yellow 2G (C.I. Mordant Yellow 1) | Good | Good | Good | Good | Good | Good | Good | Good |
| Wool red B (C.I. Acid Red 115) | Good | Good | Good | Good | Good | Good | Good | Good |
| Alizarine red S (C.I. Mordant Red 3) | Good | Good | Good | Good | Good | Good | Good | Good |
| Alizarine blue SE (C.I. Acid Blue 43) | Good | Good | Good | Good | Good | Good | Good | Good |
| Acid black JVS (C.I. Acid Black 1) | Good | Good | Good | Good | Good | Good | Good | Good |
| (3) Dyeing with metallized dyes: | | | | | | | | |
| Lanasyn yellow GLN (C.I. Acid Yellow 112) | Good | Good | Good | Good | Good | Good | Good | Good |
| Lanasyn red 2G (C.I. Acid Red 216) | Good | Good | Good | Good | Good | Good | Good | Good |
| Lanasyn brown 3RL (C.I. Acid Brown 30) | Good | Good | Good | Good | Good | Good | Good | Good |
| (4) Dyeing with disperse dyes: | | | | | | | | |
| Setacyl yellow 3G (C.I. Disperse Yellow 20) | Good | Good | Good | Good | Good | Good | Good | Good |
| Cibacet scarlet BR (C.I. Dispersed Red 18) | Good | Good | Good | Good | Good | Good | Good | Good |
| Brilliant setacyl blue BG (C.I. Disperse Blue 3) | Good | Good | Good | Good | Good | Good | Good | Good |
| Colour fastness with acid dyes | Good | Good | Good | Good | Good | Good | Good | Good |
| Colour fastness with metallized dyes | Good | Good | Good | Good | Good | Good | Good | Good |
| Colour fastness with disperse dyes | Good | Good | Good | Good | Good | Good | Good | Good |

U.S. Patent 3,151,928 granted Oct. 6, 1964 contains a proposal for improving the dye-receptivity of polyolefin fibers by incorporating therein a condensate of a primary diamine with a dihalo compound. While the dye-receptivity of polyolefins is thereby improved, it has been found that the polycondensates used in the present invention have surprisingly greater heat stability than those used in said Patent 3,151,928. To demonstrate the surprising superior heat stability of the polycondensates used in the present invention, polycondensates were prepared containing dichloroethane and an equimolar amount, respectively, of piperazine and hexamethylenediamine. The thermal stability of these polycondensates was determined by comparison of the η spec. before and after subjecting samples thereof to a temperature of 260° C. for 6 hours under a nitrogen atmosphere. The η spec. was determined in 1% methanol solution at 25° C. The results are set forth in Table III:

TABLE III

| | Sample No. | Initial η spec. | η spec. after 6 hrs. at 260° C. |
|---|---|---|---|
| Piperazine-dichloroethane polycondensation products (polycondensate of present Example 1). | (1) | 0.07 | 0.07 |
| | (2) | 0.08 | 0.07 |
| | (3) | 0.11 | 0.10 |
| Hexamethylenediamine-dichloroethane polycondensation products (polycondensate of Example 1 of U.S. Patent 3,151,928). | (4) | 0.07 | 0.032 |
| | (5) | 0.09 | 0.041 |
| | (6) | 0.20 | 0.11 |

From the results set forth in the foregoing Table III, it is apparent that the polycondensates of the instant invention have markedly greater heat stability than the polycondensates of U.S. Patent 3,151,928. That is, polycondensates of the instant invention showed little or no decrease in specific viscosity upon heating to 260° C., whereas the polycondensates of Cappuccio et al. showed a marked decrease.

The importance of this improved heat stability will be apparent to those familiar with the art inasmuch as the polymeric compositions of the present invention are subjected to elevated temperatures in most applications thereof and, in fact, are prepared in accordance with the presently preferred method by melt spinning under the elevated temperature conditions set forth in Table II.

While this invention has been illustrated with a number of different examples, it is obvious that other variations and modifications can be made without departing from the true spirit and scope of the invention.

What is claimed is:

1. A dyeable polymeric composition capable of being extruded into various shapes and forms, said composition consisting essentially of (1) a polyolefin selected from the group consisting of polyethylene and polymeric higher alpha-mono-olefins, said higher alpha-mono-olefin polymers consisting prevailingly of isotactic macromolecules, and (2) 1 to about 25% by weight of said composition of at least one basic nitrogen polycondensation product, said polycondensation product having been obtained by the reaction of a dihalo alkane or dihalo alkanol with a bis-secondary diamine.

2. The dyeable polymeric composition of claim 1 wherein the polyolefin is isotactic polypropylene.

3. The dyeable polymeric composition of claim 1 in the form of a textile fiber.

4. The fiber of claim 3 wherein the polyolefin is isotactic polypropylene.

5. The dyeable polymeric composition of claim 1 wherein the polyolefin is isotactic polypropylene and the basic-nitrogen polycondensate is obtained by the reaction of piperazine with a dihalo alkane or dihalo alkanol.

6. The dyeable polymeric composition of claim 5 wherein the dihalo alkane is dichloroethane.

7. The dyeable polymeric composition of claim 5 wherein the dihalo alkane is 1,3-dibromopropane.

8. The dyeable polymeric composition of claim 5 wherein the dihalo alkanol is 1,3-dichloro-2-propanol.

9. The dyeable polymeric composition of claim 1 wherein the basic-nitrogen polycondensation product is obtained by the reaction of a dihalo alkane or dihalo alkanol with piperazine or an alkyl substituted piperazine, said alkyl substituent being bonded to a carbon atom of the piperazine ring.

References Cited

UNITED STATES PATENTS

| | | | |
|---|---|---|---|
| 2,631,993 | 3/1953 | Morgan | 260—78 |
| 2,765,229 | 10/1956 | McLaughlin | 92—21 |
| 2,947,598 | 8/1960 | Maragliano et al. | 18—54 |
| 3,098,697 | 7/1963 | Cappuccio et al | 18—54 |
| 3,151,928 | 10/1964 | Cappuccio et al. | 8—115.5 |
| 3,215,487 | 11/1965 | Cappuccio et al. | 8—115.5 |
| 3,267,046 | 8/1966 | Bonvicini | 260—2 |

MURRAY TILLMAN, *Primary Examiner.*

T. G. FIELD, JR., *Assistant Examiner.*